United States Patent
Hashimoto et al.

(10) Patent No.: US 8,189,974 B2
(45) Date of Patent: May 29, 2012

(54) OPTICAL FIBER CABLE

(75) Inventors: Yoshio Hashimoto, Sakura (JP); Naoki Okada, Chiba (JP)

(73) Assignee: Fujikura Ltd., Tokyo (JP)

( * ) Notice: Subject to any disclaimer, the term of this patent is extended or adjusted under 35 U.S.C. 154(b) by 307 days.

(21) Appl. No.: 12/670,805

(22) PCT Filed: May 30, 2008

(86) PCT No.: PCT/JP2008/001364
§ 371 (c)(1),
(2), (4) Date: Jan. 26, 2010

(87) PCT Pub. No.: WO2009/016788
PCT Pub. Date: Feb. 5, 2009

(65) Prior Publication Data
US 2010/0189396 A1    Jul. 29, 2010

(30) Foreign Application Priority Data
Aug. 2, 2007  (JP) .................................. 2007-201901

(51) Int. Cl.
*G02B 6/00*  (2006.01)
*G02B 6/44*  (2006.01)

(52) U.S. Cl. ......................... 385/109; 385/112; 385/113

(58) Field of Classification Search .................. 385/100, 385/109–114, 147
See application file for complete search history.

(56) References Cited

U.S. PATENT DOCUMENTS

| | | | |
|---|---|---|---|
| 4,110,001 A * | 8/1978 | Olszewski et al. ............ | 385/111 |
| 4,230,395 A * | 10/1980 | Dean et al. .................... | 385/109 |
| 4,930,860 A | 6/1990 | Tansey et al. | |
| 4,976,519 A | 12/1990 | Davey et al. | |
| 6,205,277 B1 | 3/2001 | Mathis et al. | |
| 6,681,071 B2 | 1/2004 | Newton et al. | |
| 6,912,347 B2 | 6/2005 | Rossi et al. | |
| 7,995,886 B2 * | 8/2011 | Pizzorno et al. .............. | 385/109 |
| 2003/0215198 A1 | 11/2003 | Newton et al. | |
| 2005/0244115 A1 | 11/2005 | Bocanegra et al. | |
| 2006/0127014 A1 | 6/2006 | Ledbetter et al. | |

FOREIGN PATENT DOCUMENTS

| | | |
|---|---|---|
| JP | 9-138331 A | 5/1997 |
| JP | 11-044833 A | 2/1999 |
| JP | 2000-241633 A | 9/2000 |
| JP | 2001-013381 A | 1/2001 |
| JP | 2004-125914 A | 4/2004 |
| JP | 2004-191506 A | 7/2004 |
| JP | 2005-316493 A | 11/2005 |
| JP | 2006-171697 A | 6/2006 |

* cited by examiner

*Primary Examiner* — Akm Ullah

(74) *Attorney, Agent, or Firm* — Sughrue Mion, PLLC

(57) ABSTRACT

An optical fiber cable 1 includes: a cable core 9 formed by stranding a plurality of loose tubes 7, each housing at least one optical fiber 5, on the periphery of a centered tension member 3; and a sheath 11 disposed on the outer periphery of the cable core 9. The sheath 11 includes: a first sheath portion 13 in which the sheath is embedded in between each of the loose tubes 7; and a second sheath portion 15, in which the sheath 11 is circumscribed around the cable core 9, to be thereby formed in a pipe shape. The first sheath portion 13 and the second sheath portion 15 are alternately positioned over the entire length of the cable core 9.

15 Claims, 4 Drawing Sheets

200
OPTICAL FIBER CABLE

TECHNICAL FIELD

The present invention relates to an optical fiber cable, particularly to an optical fiber cable in which a plurality of loose tubes, each of which houses an optical fiber, are stranded and a sheath is formed on the outer periphery of the plurality of the loose tubes.

BACKGROUND ART

A conventional loose tube type optical fiber cable includes an optical fiber, a plurality of loose tubes each housing the optical fiber and being made of a thermoplastic resin material such as PBT, a centered tension member disposed in the center of the plurality of the loose tubes, and a sheath disposed on the outer periphery of the plurality of the loose tubes. In the loose tube type optical fiber cable, the plurality of loose tubes are stranded and collected in the circumference of the centered tension member, for example, in the SZ direction. Further, the sheath covers the outer periphery of the plurality of loose tubes thus collected.

A well-known structure of the above sheath is one in which the sheath is extrusion molded so as to form a hollow shape which is circumscribes with the outer periphery of the plurality of loose tubes. Additionally, another known structure of the above sheath is extrusion molded so that a sheath material is embedded in between the plurality of collective loose tubes (hereinafter referred to as filled extrusion molding).

Recently, in Europe and the United States where the loose tube type optical fiber cables are mainstream, the followings are being worked on to improve the installation workability of optical fiber cables into ducts: (a) improving pneumatic feeding performance and (b) rendering optical fiber cables dry.

U.S. Pat. No. 6,912,347 discloses a structure of an optical fiber cable in which a cable core is formed by intertwining a plurality of loose tubes each housing optical fibers. Moreover, when a sheath is placed on the outer periphery of the cable core, the thickness of the above sheath is made constant. This renders the outer shape of the sheath the same as or similar to that of the plurality of loose cables in the cable core.

Regarding (a) improving pneumatic feeding performance, the optical fiber cable of U.S. Pat. No. 6,912,347 is characterized by the reduction in sheath friction and the wavy surface of the sheath. In other words, the sheath is made thin with its thickness being constant so that the stranded texture shape of the loose tube would be exposed to the surface. Additionally, this document describes a thin, light-weight structure capable of being wired to a microduct.

According to U.S. Pat. Nos. 6,205,277 and 6,681,071, a plurality of loose tubes each housing optical fibers are stranded together to form a core cable. Then, a waterproof tape is placed on the outside of the plurality of loose tubes in this cable core. Thereafter, a sheath is formed on the outer periphery of the waterproof tape by filled extrusion molding. That is, a part of the sheath is embedded in between the plurality of loose tubes. Moreover, in all the above-described optical fiber cables, a waterproof method between the cable core and the sheath involves placing a waterproof tape around the outer periphery of the loose tubes, to thereby work on the above-described point, (b) rendering optical fiber cables dry.

According to JP-A-9-138331, foamed polyethylene (foamed PE) is formed, as a sheath, on the outer periphery of stranded optical fibers by filled extrusion molding. In this case, foamed polyethylene has a low Young's modulus and it is directly extrusion molded on the outer periphery of optical fibers, so the adhesion between the optical fiber strand and the sheath is increased. Accordingly, a structure unlikely to be bent is achieved, so that (a) improving pneumatic feeding performance is achieved.

U.S. Pat. No. 4,976,519 discloses an optical fiber in which an inner sheath is formed on stranded optical fibers by filled extrusion molding, and further an outer sheath is placed on the outer periphery of the inner sheath. In other words, a two-layer sheath is formed on the optical fiber cable. The inner sheath is a low Young's modulus material and is configured so as to be embedded in between the optical fibers to serve as a buffer layer. On the other hand, the outer sheath achieves (a) improving pneumatic feeding performance.

According to U.S. Pat. No. 4,930,860, a thin film is placed on the outer periphery of stranded optical fibers so as to cover it, and on its outer periphery is formed a sheath by filled extrusion molding.

[Patent Citation 1]
U.S. Pat. No. 6,912,347
[Patent Citation 2]
U.S. Pat. No. 6,205,277
[Patent Citation 3]
U.S. Pat. No. 6,681,071
[Patent Citation 4]
JP-A-9-138331
[Patent Citation 5]
U.S. Pat. No. 4,976,519
[Patent Citation 6]
U.S. Pat. No. 4,930,860

DISCLOSURE OF INVENTION

Technical Problem

The structures of the optical fiber cables of U.S. Pat. No. 6,912,347 and JP-A 9-138331 are specialized mainly in pneumatic feeding performance, thus the strengths of the sheaths are weak. Therefore, they are inferior in mechanical strength thereof such that the lateral load characteristics and the like.

In addition, the optical fiber cables of U.S. Pat. Nos. 6,205,277 and 6,681,071 become large due to the thickness of an absorptive tape. Such structures have disadvantage in a cable like a microduct cable in which the outer diameter of a cable severely affects pneumatic feeding performance.

Additionally, the optical fiber cable of U.S. Pat. No. 4,976,519 includes the sheath layer with the low Young's modulus in its inside, as the buffer layer, formed by filled extrusion molding, for the improvement of mechanical strength. However, the optical fiber has disadvantage in production cost due to an increase in steps.

From the viewpoints described above, the problems of conventional optical fiber cables are indicated in the following.

(1) When reducing the diameter and the weight by the formation of a constant thin sheath and improving the sheath surface shape are attempted, the mechanical strength of the optical fiber cable becomes inferior.

(2) When the bend liability of an optical fiber cable is removed by a sheath in which foamed polyethylene (foamed PE) with a low Young's modulus is filled in between optical fibers, the mechanical strength of the optical fiber cable becomes inferior.

(3) In a structure in which an optical fiber cable is attempted to be rendered dry by disposing a water absorptive tape along the core cable while the tape is circumscribed around the loose tube, the outer diameter of the cable becomes large and the adhesion between the cable core and the sheath becomes small. Therefore, pneumatic feeding performance becomes inferior.

In this regard, an object of the present invention is to provide a thin, lightweight optical fiber cable having sufficient pneumatic feeding performance while maintaining mechanical strength.

Technical Solution

For solving the above problems, a first aspect of the present invention is an optical fiber cable which includes: a centered tension member; a cable core including a plurality of loose tubes, stranded on the outer periphery of the centered tension member, each loose tube housing at least one optical fiber; and a sheath disposed on the outer periphery of the cable core, the sheath having a first sheath portion in which a part of the sheath is embedded in between the loose tubes, and a second sheath portion in which the sheath is circumscribed around the cable core to be thereby formed in a pipe shape; wherein the first sheath portion and the second sheath portion are alternately positioned over the entire length of the cable core.

In addition, the optical fiber cable of the present invention preferably satisfies, in the cross section of the optical fiber cable including the first sheath portion, the equation:

$$T_P < T_S \leq (D - D_{TM} - D_{tube})/2 \quad [\text{Math. 1}]$$

where an outer diameter of the optical fiber cable is represented by D, an outer diameter of the centered tension member is represented by $D_{TM}$, an outer diameter of the loose tube is represented by $D_{tube}$, an thickness of the sheath outside the loose tube is represented by $T_p$ and an thickness of the sheath disposed in between the loose tubes is represented by $T_s$.

Further, it is preferable that the first sheath portion has an interval of from 20 mm to 50 mm in the optical fiber cable according to the present invention.

Moreover, it is preferable the optical fiber cable according to the first aspect of the present invention includes a corded member wound on the periphery of the cable core with a predetermined pitch.

A second aspect of the present invention is an optical fiber cable which includes: a centered tension member; a core cable including a plurality of loose tubes stranded on the outer periphery of the centered tension member, each loose tube housing at least one optical fiber; a corded member wound on the outer periphery of the cable core with a predetermined pitch; and a sheath disposed on the outer periphery of the cable core, the sheath having a first sheath portion in which a part of the sheath is embedded in between the loose tubes and a second sheath portion in which the sheath is not embedded in between the loose tubes; wherein the corded member has a width which blocks penetration of the sheath in between the loose tubes.

In the optical fiber cable according to the second aspect of the present invention, it is preferable that the corded member is wound crosswise.

Further, in the optical fiber cable according to the first aspect or second aspect of the present invention, it is preferable that the corded member is constituted of a water absorptive material.

Furthermore, in the optical fiber cable according to the first aspect or second aspect of the present invention, it is preferable that the corded member is a flat-shaped yarn to which a water absorptive powder is applied.

Moreover, in the optical fiber cable according to the first aspect or second aspect of the present invention, it is preferable that the corded member is a water absorptive unwoven cloth of a small width.

Further, in the optical fiber cable according to the first aspect or second aspect of the present invention, the optical fiber may have a rip cord applied a water absorptive powder thereto, and the rip cord may be disposed along the plurality of loose tubes of the cable core.

ADVANTAGEOUS EFFECTS

According to the aspect of the present invention, the first sheath portion and the second sheath portion are provided in the optical fiber cable. They are alternately intermittently repeated over the longitudinal direction of the cable core. This makes it possible to produce a thin, lightweight cable structure having sufficient pneumatic feeding performance while maintaining the mechanical strength of an optical fiber cable. In addition, in the first sheath portion, the deviation of the relative position of each loose tube can be prevented; in the second sheath portion, the loose tube can be easily taken out.

According to the aspect of the present invention, the corded member is provided and the corded member is wound with the predetermined pitch on the outer periphery of the cable core in a longitudinal direction thereof. The corded member has a width that blocks penetration of the sheath in between the loose tubes. Accordingly, in a region where the corded member is disposed, the second sheath portion is formed in a pipe shape. Alternatively, in a region where the corded member is not disposed, the first sheath portion is formed in a shape in which a part of the sheath is embedded in between the loose tubes. With this configuration, it is possible to obtain a thin, lightweight cable structure having sufficient pneumatic feeding performance while maintaining the mechanical strength of the optical fiber cable. Also, in the first sheath portion, the deviation of the relative position of each loose tube can be prevented; in the second sheath portion, the loose tube can be easily taken out.

BRIEF DESCRIPTION OF DRAWINGS

FIG. 1A is a schematic front view of the optical fiber cable. FIG. 1B is a sectional view taken along the arrow IB-IB line of FIG. 1A; FIG. 1C is a sectional view taken along the arrow IC-IC line of FIG. 1A.

FIG. 4A is a sectional view of the optical fiber cable. FIG. 4B is a sectional view taken along the arrow IVB-IVB line of FIG. 4A.

BEST MODE FOR CARRYING OUT THE INVENTION

Embodiments of the present invention will be described below with reference to the drawings.

Figure 1A:
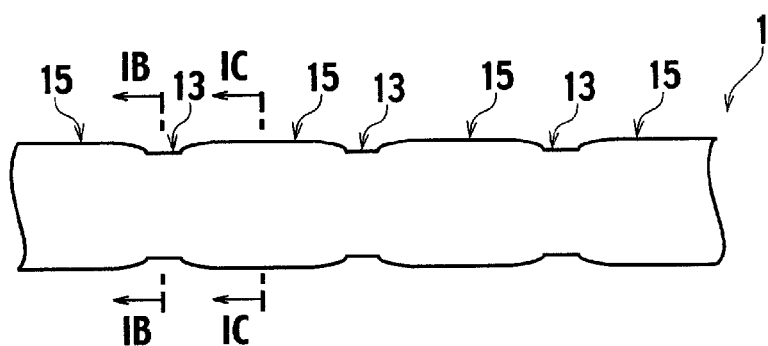
FIGS. 1A, 1B and 1C are schematic diagrams of an optical fiber cable according to a first embodiment of the present invention.
Figure 1B:
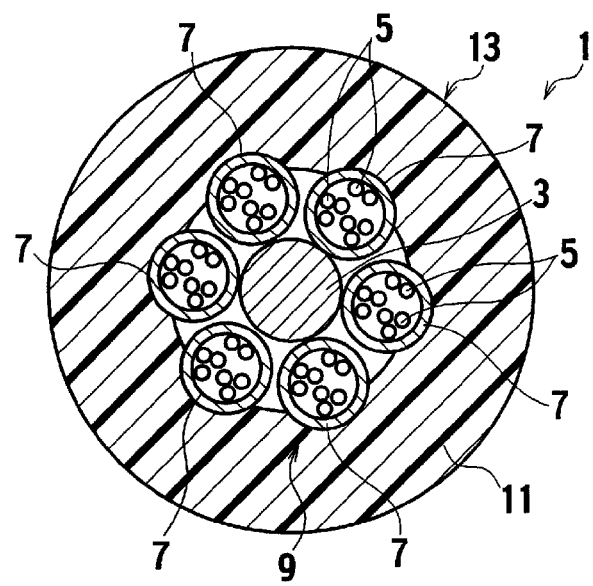
Figure 1C:
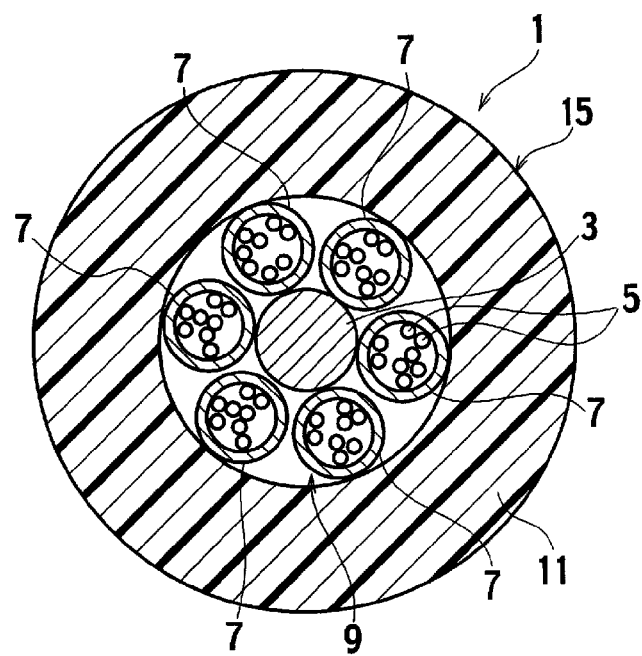

As shown in FIGS. 1A to 1C, an optical fiber cable 1 according to a first embodiment of the present invention includes: a centered tension member 3 serving as a member resistant to a tensile stress; a plurality of loose tubes 7, each of which houses at least one optical fiber 5, on the outer periphery of the centered tension member 3; a cable core 9 formed by stranded loose tubes 7; and a sheath 11 disposed on the outer periphery of the cable core 9. As illustrated in FIGS. 1B and 1C, the sheath 11 includes a sheath portion (a first sheath portion) 13 forming in a shape in which a part of the sheath 11 is embedded in between each of the loose tubes 7, and a sheath portion (a second sheath portion) 15 forming in a pipe shape which is circumscribed around the plurality of loose tubes 7 of the cable core 9. These sheath portions 13 and 15 are alternately disposed over the entire length of the cable core 9.

The sheath portion 13 restrains a crush of the loose tube 7 caused by a load (pressure) from the lateral face. In addition, the material of the sheath 11 is a resin made of a normal HDPE (high density polyethylene) or LLDPE (linear low density polyethylene), which are suitable for pneumatic feeding performance.

Intervals between the adjacent sheath portions 13 (in other words, intervals between the adjacent sheath portions 15) is shorter than the width of a plate applying a lateral load (pressure) to the optical fiber cable 1, the plate used in the lateral load test regulated in the specification of a general optical fiber cable. Accordingly, the intervals do not affect the mechanical characteristics of the optical fiber cable 1.

The sheath portions 13, 15 according to the first embodiment are formed, for example, in such a manner that the sheath 11 is extruded by extrusion molding by means of an extruder (not shown) and then intermittently pressed from its outside while the sheath 11 is in a semi-molten state. Here, the interval of the sheath portions 13 is desirably roughly from 20 to 50 mm.

Figure 2:
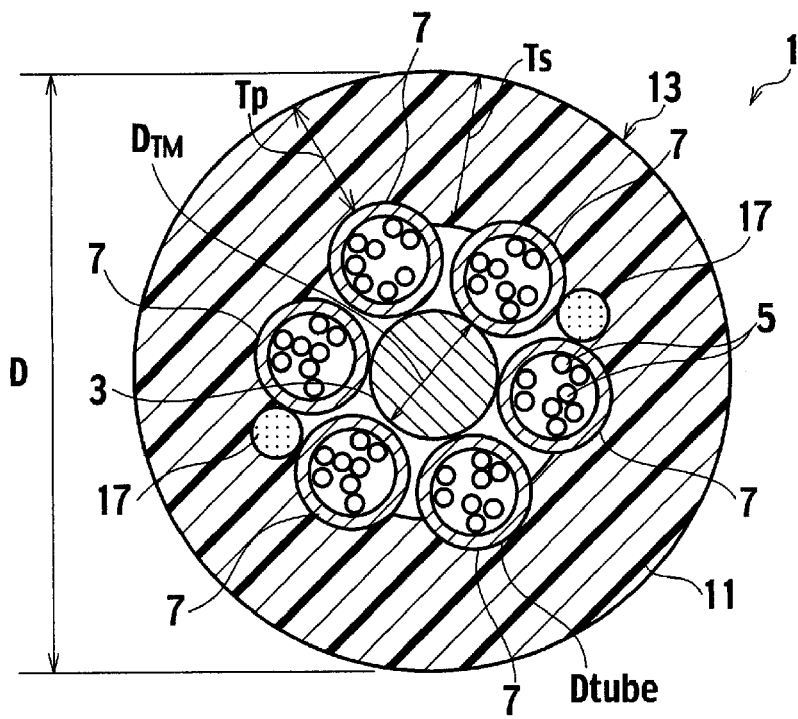
FIG. 2 is a sectional view showing another example of an optical fiber cable according to the first embodiment of the present invention.

According to the optical fiber cable 1 shown in FIG. 2, it is possible to maintain a stranded state of the plurality of the loose tubes 7, for example, by winding the corded member 17 crosswise on the circumference of the plurality of the loose tubes 7 with a predetermined pitch. That is, the corded member 17 is wound thereon by cross binding. Additionally, although FIG. 2 indicates the corded member 17 being rolled by cross binding, the corded member 17 may be rolled in one direction with the predetermined pitch. Moreover, the use of a water absorptive material for the corded member 17 can provide waterproof performance to the optical fiber cable 1.

In the optical fiber cable 1 of the first embodiment, it is desired that a rip cord (not shown) is disposed along the loose tubes 7 and a water absorptive powder is applied to the rip cord. For example, FIG. 2 shows that the corded member 17 is wound crosswise with a predetermined pitch. However, the corded member 17 can be replaced with the rip cord, and the rip cord can be placed in an opposite position with the centered tension member 3 in between as shown in FIG. 2. Note that this replacement is available in a case where the corded member 17 is rolled in one direction. Alternately, in addition to the corded member 17 in FIG. 2, the above-mentioned rip cord can be disposed along the loose tubes 7 as well. The above-described configurations can give the optical fiber cable 1 to have waterproof performance or to further improve waterproof performance.

Alternatively, the corded member 17 or rip cord may be a water absorptive yarn, narrow water absorptive unwoven cloth, or other forms of water absorptive material, in place of a configuration in which the water absorptive powder is applied to the corded member 17 or rip cord.

In addition, in the cross sectional shape of the above mentioned sheath portion 13, the extent (thickness) of the embedded sheath 11 in between the loose tubes 7 desirably satisfies the following equation:

$$T_P < T_S \leqq (D - D_{TM} - D_{tube})/2 \qquad \text{[Math. 2]}$$

where, as illustrated in FIG. 2, the outer diameter of the cable is represented by D, the outer diameter of the centered tension member is represented by $D_{TM}$, the outer diameter of the loose tube is represented by $D_{tube}$, the thickness of the sheath outside the loose tubes 7 is represented by $T_p$ and the thickness of the sheath disposed in between the loose tubes 7 is represented by $T_s$. It is desirable to satisfy the above equation from the viewpoints of assurance of the mechanical strength of the optical fiber cable 1 and improvement of dismantling workability (i.e. ease of taking-out the loose tubes 7).

Figure 3:
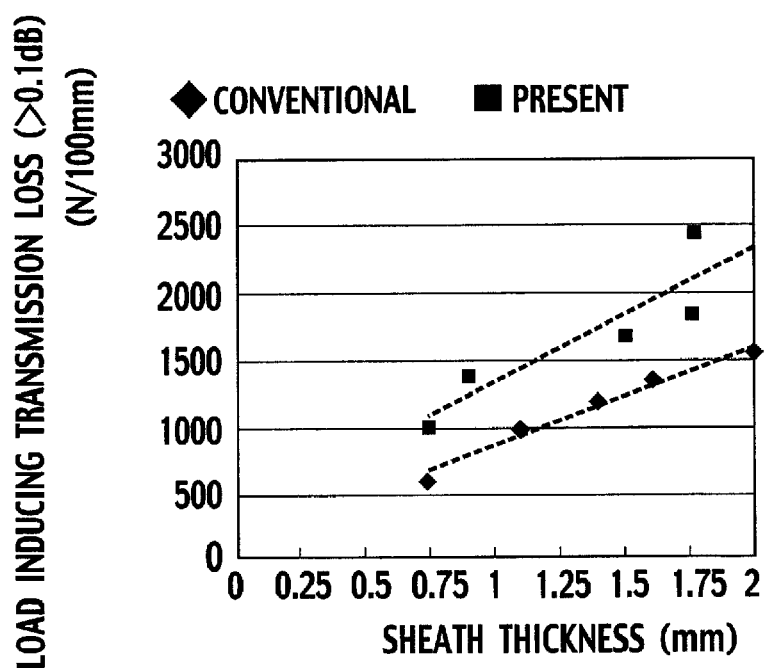
FIG. 3 shows a graph indicating the relationship between the sheath thickness and the lateral load strength when the transmission loss exceeds 0.1 dB.

FIG. 3 shows a graph indicating lateral loads (pressures) applied to the optical fiber cable 1 according to the first embodiment when the transmission loss exceeds 0.1 dB, against various sheath thicknesses $T_P$ outside the loose tubes 7 of the optical fiber cable 1 as shown in FIG. 2. In addition, the graph also indicates lateral loads applied to conventional optical fiber cable having a sheath formed in a pipe structure when the transmission loss exceeds 0.1 dB, against various sheath thicknesses of the conventional optical fiber cable. The filled square marks in the graph indicate the lateral loads applied to the optical fiber cable of the first embodiment of the present invention. The diamond marks therein show the lateral loads applied to the conventional optical fiber cable.

The graph of FIG. 3 shows that the optical fiber cable 1 of the first embodiment has a good lateral load characteristic even when its sheath thickness is smaller than that of the conventional optical fiber cable. In other words, the outer diameter of the cable can be made smaller than that of the conventional optical fiber cable.

As a result, the optical fiber cable 1 according to the first embodiment of the present invention offers the advantages indicated below.

(1) The cable can be made to have a cable structure which is thin and lightweight and which has sufficient pneumatic feeding performance while maintaining a sufficient mechanical strength.

In other words, the structure of the sheath portion 13 forms in a shape in which the part of the sheath 11 is embedded in between each of the loose tubes 7. The structure of the sheath portion 15 forms in a pipe shape in which the sheath 11 is circumscribed around the plurality of the loose tubes 7 of the cable core 9. These structures are alternately intermittently repeated over the longitudinal direction of the cable core 9. Therefore, the sheath 11 in the sheath portion 13 serves as a reinforcement material of the loose tubes 7. Accordingly, the diameter can be small without decreasing the lateral load strength of the optical fiber cable 1. This can reduce the weight of the optical fiber cable 1 and improve the pneumatic feeding performance.

Additionally, the sheath portion 13 can prevent the deviation of the relative position of each of the loose tubes 7, and the sheath portion 15 can make taking out of the loose tube 7 easy.

As discussed in more detail hereinafter, since the part of the sheath 11 in the sheath portion 13 is embedded in between the plurality of the stranded loose tubes 7, the embedded sheath makes taking out of the loose tube 7 hard, however, it prevents the deviation of the relative position of each of the loose tubes. On the other hand, in the sheath portion 15, the penetration of the sheath 11 in between each of the loose tubes 7 is not present, and then the relative position of each of the loose tubes 7 is likely to vary, and then the loose tube 7 can be easily taken out.

When the optical fiber cable 1 is used in an operation, it is effective to initiate from the sheath portion 15, because the loose tube 7 is easily taken out and the sheath portion 15 can be easily judged from the appearance as shown in FIG. 1A. Therefore, the operation efficiency is improved by a manner described above.

(2) When the corded member 17 or rip cord is disposed, the optical fiber cable 1 having a dry waterproof structure can be produced by applying a water absorptive material to the corded member 17 or rip cord. This means that the optical fiber cable 1 is not required to have a water absorptive core wrap such as a conventional waterproof tape. Therefore, this makes it possible to reduce the diameter of the optical fiber cable 1 and to improve the pneumatic feeding performance (wiring properties) to a duct.

(3) Because the cable structure of the present invention does not have a water absorptive core wrap such as a waterproof tape or the like in the conventional cable structure, when the loose tube 7 is peeled off, a core wrap removal operation is not needed after removing the sheath. The core wrap removal operation involves, for example, cutting and releasing the corded member 17 binding the cable core 9 by cross binding, and then removing the core wrap.

Next, an optical fiber cable 19 according to a second embodiment of the present invention will be described with reference to the drawings. Here, since the cable is almost the same as the optical fiber cable 1 of the first embodiment described above, only different parts will be primarily described and like members are assigned with the same reference numerals, and the detailed descriptions thereof will be omitted.

Figure 4A:
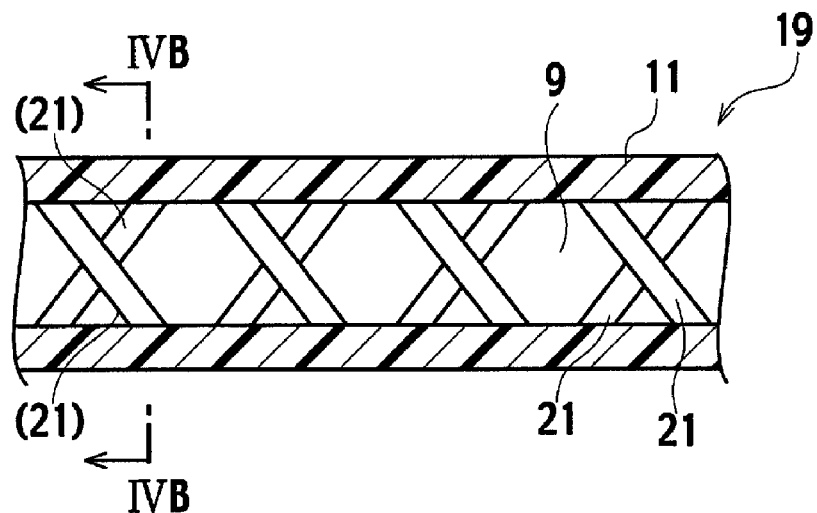
FIGS. 4A and 4B are schematic diagrams of an optical fiber cable according to a second embodiment of the present invention.
Figure 4B:
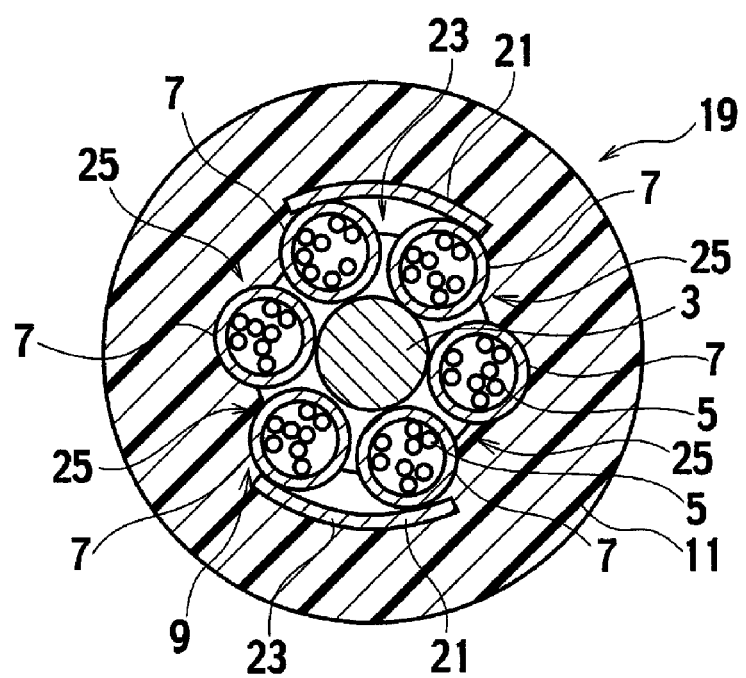

As shown in FIGS. 4A and 4B, the optical fiber cable 19 according to the second embodiment includes a centered tension member 3 serving as a member resistant to a tensile stress; a plurality of loose tubes 7, each of which houses at least one optical fiber 5, on the outer periphery of the centered tension member 3; a cable core 9 formed by stranded loose tubes 7; and a sheath 11 disposed on the outer periphery of the cable core 9.

Furthermore, a corded member 21 is wound on the outer periphery of the cable core 9 in a longitudinal direction thereof with a predetermined pitch. The corded member 21 has a width which blocks penetration of the sheath 11 in between the loose tubes 7. Specifically, the sheath 11 according to the second embodiment includes a sheath portion (a first sheath portion) 25 in which a part of the sheath 11 is embedded in between the loose tubes and a sheath portion (a second sheath portion) 23 in which the sheath 11 is not embedded in between the loose tubes 7. The sheath portion 25 is provided in a region where the corded member 21 is not disposed on the cable core 9.

In the second embodiment, the corded member 21 is flat-shaped yarn or a tape. In a region where the corded member 21 is disposed, the sheath 11 therein forms in a pipe shape. In a region where the corded member 21 is not disposed, the sheath therein forms in a shape in which a part of the sheath 11 is embedded in between the loose tubes 7. Preferably, it is desired that the width of the yarn or the tape is roughly from 2 mm to 10 mm and that it is wound around the cable core 9 with a predetermined pitch roughly from 15 mm to 50 mm.

As described above, the corded member 21 is desirably flat in order to reduce the outer diameter of the cable; however, it is not necessarily limited to the flat shape.

Further, the optical fiber cable 19 can have waterproof performance by using a water absorptive material such as water absorptive yarn or a water absorptive tape as the above-mentioned corded member 21. This means that the optical fiber cable 19 is not required to have a core wrap such as a conventional waterproof tape. Particularly, in an extremely thin cable like a microduct cable, reduction of the diameter resulted from removing the core wrap greatly contributes to the improvement of the pneumatic feeding performance of the optical fiber cable 19.

FIG. 4B shows the optical fiber cable 19 as a 72-core optical fiber cable with an outer diameter 8.5 mm, for example. This figure indicates that the outer diameter is reduced by the present invention. In this case, a flat-shaped, low contract, water absorptive polyester yarn is used for the corded member 21.

Figure 5:
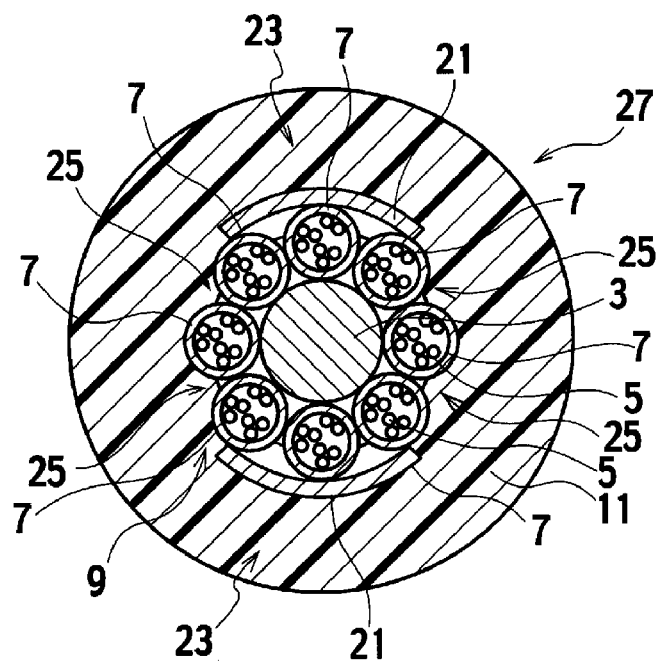
FIG. 5 is a sectional view showing another example of an optical fiber cable according to the second embodiment of the present invention.

FIG. 5 shows an optical fiber cable 27 of another embodiment as a 96-core optical fiber cable with an outer diameter 10 mm, for example. This figure also indicates that the outer diameter is reduced by the present invention. As shown in this figure, a flat-shaped, low contract, water absorptive polyester yarn is used for the corded member 21.

Figure 6:
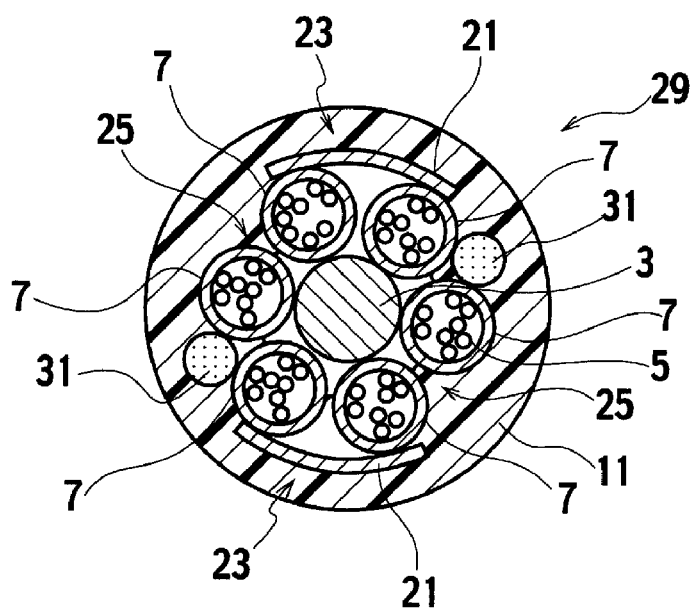
FIG. 6 is a sectional view showing another example of an optical fiber cable according to the second embodiment of the present invention.

FIG. 6 shows an optical fiber cable 29 of another embodiment as a 72-core optical fiber cable with an outer diameter 6 mm, which is capable of being pneumatically fed to a duct of a diameter of from 8 mm to 10 mm. As shown in this figure, a flat-shaped, low contract, polyester yarn is used for the corded member 21. Furthermore, two water absorptive yarns serving as a rip cord 31 are disposed along the plurality of loose tubes 7 in order to have the waterproof performance of the optical fiber cable 29. The yarns are positioned along a longitudinal direction of the loose tubes 7 so that they pinch the centered tension member 3. This optical fiber cable 29 has been confirmed to be capable of feeding to a duct of 2,000 m (meters) or more.

In addition, the corded member 21 or rip cord 31 may be a material applied water absorptive powder thereto, water absorptive yarn, narrow water absorptive unwoven cloth or other forms of water absorptive material, as described in the first embodiment.

Consequently, the optical fiber cable 19 of the second embodiment of the present invention offers the advantages indicated below. Basically, the advantages offered by the optical fiber cable 19 are substantially the same as that offered by the optical fiber cable 1 of the first embodiment described above.

(1) The corded member 21 is wound on the cable core 9 in its longitudinal direction with a predetermined pitch. The corded member 21 has a width which blocks the penetration of the sheath 11 into between the loose tubes 7. Accordingly, in a region where the corded member 21 is disposed, the sheath portion 23 in the sheath 11 is formed in a pipe shape. In a region where the corded member is not disposed, the sheath portion 25 in the sheath 11 is formed in a shape in which a part of the sheath 11 is embedded in between the loose tubes 7. Since the sheath portion 25 functions as the reinforced material of the loose tubes 7, the diameter can be made small without decreasing the lateral load strength of the optical fiber cable 19. This improves the feeding performance of the optical fiber cable 19 to the duct.

(2) The optical fiber cable 19 having a dry waterproof structure can be produced by applying a water absorbent material to the corded member 21. This means that the optical fiber cable 19 is not required to have a water absorptive core wrap such as a conventional waterproof tape. Therefore, the diameter of the optical fiber cable 19 can be reduced and the pneumatic feeding performance (wiring performance) to the duct can be improved.

In a case where the rip cord 31 and/or the like is disposed, the cable offers operation and advantages as in the case of the optical fiber cable 1 according to the first embodiment.

[Industrial Applicability]

An optical fiber cable according to the present invention has a sheath including a first sheath portion and a second sheath portion, which are alternately intermittently repeated over the longitudinal direction of the cable. The first sheath portion is formed in a shape in which a part of the sheath is embedded in between loose tubes. The second sheath portion is formed in a pipe shape in which the sheath is not embedded therebetween. Accordingly, a thin, lightweight cable structure having sufficient pneumatic feeding performance can be made. Further, the optical fiber cable maintains the mechanical strength thereof. In addition, the deviation of the relative position of each loose tube can be prevented in the first sheath portion, and the loose tube can be easily taken out in the second sheath portion.

The invention claimed is:

1. An optical fiber cable comprising:
    a centered tension member;
    a cable core including a plurality of loose tubes,
    stranded on the outer periphery of the centered tension member,
    each loose tube housing at least one optical fiber; and a sheath disposed on the outer periphery of the cable core,
    the sheath having a first sheath portion in which a part of the sheath is embedded in between the loose tubes, and
    a second sheath portion in which the sheath is circumscribed around the cable core to be thereby formed in a pipe shape;
    wherein the first sheath portion and the second sheath portion are alternately positioned over the entire length of the cable core.

2. The optical fiber cable according to claim 1, satisfying, in a cross section of the optical fiber cable including the first sheath portion, the equation:

$$T_P < T_S \leqq (D - D_{TM} - D_{tube})/2 \quad \text{[Math. 3]}$$

where an outer diameter of the optical fiber cable is represented by D, an outer diameter of the centered tension member is represented by $D_{TM}$, an outer diameter of the loose tube is represented by $D_{tube}$, an thickness of the sheath outside the loose tube is represented by $T_p$ and an thickness of the sheath disposed in between the loose tubes is represented by $T_s$.

3. The optical fiber cable according to claim 1, wherein the first sheath portion is formed at an interval of from 20 mm to 50 mm.

4. The optical fiber cable according to claim 1, further comprising a corded member wound on the periphery of the cable core with a predetermined pitch.

5. The optical fiber cable according to claim 4, wherein the corded member is wound crosswise.

6. The optical fiber cable according to claim 4, wherein the corded member is constituted of a water absorptive material.

7. The optical fiber cable according to claim 4, wherein the corded member is a flat-shaped yarn applied a water absorptive powder thereto.

8. The optical fiber cable according to claim 4, wherein the corded member is a narrow water absorptive unwoven cloth.

9. The optical fiber cable according to claim 1, further comprising a rip cord applied a water absorptive powder thereto, and is disposed along the plurality of the loose tubes.

10. An optical fiber cable comprising:
    a centered tension member;
    a core cable including a plurality of loose tubes stranded on the outer periphery of the centered tension member, each loose tube housing at least one optical fiber;
    a corded member wound on the outer periphery of the cable core with a predetermined pitch; and
    a sheath disposed on the outer periphery of the cable core, the sheath having a first sheath portion in which a part of the sheath is embedded in between the loose tubes and a second sheath portion in which the sheath is not embedded in between the loose tubes;
    wherein the corded member has a width which blocks penetration of the sheath in between the loose tubes.

11. The optical fiber cable according to claim 10, wherein the corded member is wound crosswise.

12. The optical fiber cable according to claim 11, wherein the corded member is constituted of a water absorptive material.

13. The optical fiber cable according to claim 12, wherein the corded member is a flat-shaped yarn applied a water absorptive powder thereto.

14. The optical fiber cable according to claim 12, wherein the corded member is a narrow water absorptive unwoven cloth.

15. The optical fiber cable according to claim 10, further comprising a rip cord applied a water absorptive powder thereto, and is disposed along the plurality of the loose tubes.

* * * * *